(12) United States Patent
Meder

(10) Patent No.: US 11,637,295 B2
(45) Date of Patent: Apr. 25, 2023

(54) MEDIA MANAGEMENT PLATE COMPRISING WATER TRAP AND WATER RESERVOIR, AND FUEL CELL SYSTEM

(71) Applicant: PROTON MOTOR FUEL CELL GMBH, Puchheim (DE)

(72) Inventor: Quirin Meder, Schondorf (DE)

(73) Assignee: PROTON MOTOR FUEL CELL GMBH, Puchheim (DE)

( * ) Notice: Subject to any disclaimer, the term of this patent is extended or adjusted under 35 U.S.C. 154(b) by 562 days.

(21) Appl. No.: 16/603,575

(22) PCT Filed: Mar. 27, 2018

(86) PCT No.: PCT/EP2018/057759
§ 371 (c)(1),
(2) Date: Oct. 9, 2019

(87) PCT Pub. No.: WO2018/184912
PCT Pub. Date: Oct. 11, 2018

(65) Prior Publication Data
US 2021/0091390 A1    Mar. 25, 2021

(30) Foreign Application Priority Data
Apr. 7, 2017   (DE) ..................... 10 2017 107 479.1

(51) Int. Cl.
*H01M 8/0432* (2016.01)
*H01M 8/04492* (2016.01)
(Continued)

(52) U.S. Cl.
CPC ..... *H01M 8/0258* (2013.01); *H01M 8/04358* (2013.01); *H01M 8/04514* (2013.01); *H01M 8/04723* (2013.01); *H01M 8/04843* (2013.01)

(58) Field of Classification Search
CPC .......... H01M 8/0258; H01M 8/04358; H01M 8/04514; H01M 8/04723; H01M 8/04843;
(Continued)

(56) References Cited

U.S. PATENT DOCUMENTS 6,541,148 B1 * 4/2003 Walsh ................ H01M 8/04119
429/434
8,822,095 B2   9/2014 Hennesen et al.
(Continued)

FOREIGN PATENT DOCUMENTS

CN      102272995 A      12/2011
DE    112010005734 B4    7/2013
(Continued)

OTHER PUBLICATIONS

International Search Report and Written Opinion issued in PCT/EP2018/057759, dated Aug. 13, 2018, 26 pages.
(Continued)

*Primary Examiner* — Christian Roldan
(74) *Attorney, Agent, or Firm* — Arc IP Law, PC; Joseph J. Mayo

(57) ABSTRACT

The invention relates to a media management plate (1) for a fuel cell assembly (5), a fuel cell system (10) comprising the media management plate and a fuel cell assembly, and a method of operating a fuel cell system (10) comprising a fuel cell assembly (5) and the media management plate (1). All lines for supplying and discharging the fuel cell media and all devices necessary for treating the fuel cell media are integrated in the media management plate (1). The media management plate (1) can be heated by means of coolant and is functional both when oriented vertically and horizontally.

21 Claims, 12 Drawing Sheets

(51) Int. Cl.
*H01M 8/04701* (2016.01)
*H01M 8/04828* (2016.01)
*H01M 8/0438* (2016.01)
*H01M 8/04746* (2016.01)
*H01M 8/04119* (2016.01)
*H01M 8/04082* (2016.01)
*H01M 8/04089* (2016.01)
*H01M 8/0258* (2016.01)

(58) Field of Classification Search
CPC ......... H01M 8/04328; H01M 8/04335; H01M 8/04343; H01M 8/0435; H01M 8/04388; H01M 8/04395; H01M 8/04402; H01M 8/0441; H01M 8/04708; H01M 8/04753; H01M 8/04089; H01M 8/04164; H01M 8/04201; H01M 8/04291; H01M 8/04302; H01M 8/2484; H01M 8/04097; H01M 8/04225; H01M 8/04492; H01M 8/04716; H01M 8/04761; H01M 8/04828; H01M 8/02; H01M 8/04029; H01M 8/04074; H01M 8/04253; Y02E 60/50
USPC ........................................................ 429/437
See application file for complete search history.

(56) References Cited

U.S. PATENT DOCUMENTS

| | | | | |
|---|---|---|---|---|
| 2008/0160372 A1* | 7/2008 | Shiomi | ............. | H01M 8/04253 429/535 |
| 2011/0294028 A1* | 12/2011 | Hannesen | ............. | H01M 8/241 429/455 |
| 2012/0135326 A1 | 5/2012 | Cherchi et al. | | |
| 2013/0202979 A1* | 8/2013 | Katano | ............. | H01M 8/04303 429/513 |
| 2015/0188158 A1 | 7/2015 | Kells et al. | | |
| 2016/0141693 A1 | 5/2016 | Hotta et al. | | |

FOREIGN PATENT DOCUMENTS

| | | |
|---|---|---|
| DE | 102016004823 A1 | 10/2017 |
| EP | 2966717 B1 | 1/2016 |
| JP | 2007-200698 | 8/2007 |
| JP | 2009-163912 | 7/2009 |
| JP | 2012-508947 | 4/2012 |
| JP | 5346091 B2 | 11/2013 |
| JP | 2016-096012 | 5/2016 |
| KR | 1020150077686 | 7/2015 |
| KR | 101564705 B1 | 10/2015 |

OTHER PUBLICATIONS

Office Action Issued in JP2019-553206 dated Mar. 1, 2022 (13 pages), and English Machine translation thereof (16 pages).
Research Report issued in D102017107479.1 dated Dec. 15, 2017, and translation thereof.
Notice of Preliminary Rejection issued in KR10-2019-7028135 dated Sep. 28, 2021, and translation thereof.
First Office Action issued in CN2022012401787140 issued in Jan. 27, 2022, and translation thereof.

* cited by examiner

MEDIA MANAGEMENT PLATE COMPRISING WATER TRAP AND WATER RESERVOIR, AND FUEL CELL SYSTEM

BACKGROUND OF THE INVENTION

Field of the Invention

The present invention relates to a media management plate incorporating the lines, sensors, and actuators necessary for supplying the fuel cell media anode operating gas, cathode operating gas, and coolant and discharging the media used, a fuel cell system comprising a media management plate, and a method of operating a fuel cell system comprising a media management plate.

Description of the Related Art

Fuel cells generate electrical energy from hydrogen and oxygen. In addition, they need a coolant, such as water or a glycol/water mixture for cooling. These fuel cell media have to be supplied to the fuel cells and also have to be discharged therefrom again after flowing through the fuel cells. Cooling water is usually conducted in a cooling water circuit and only occasionally supplemented or drained and refilled. Oxygen is typically supplied continuously in the form of air, and the oxygen-depleted air after passage through the fuel cells is continuously discharged. Hydrogen or another anode operating gas has to be supplied from a reservoir, such as a pressure bottle or liquid gas tank. The hydrogen has to be brought to and maintained at the pressure suitable for operation of the fuel cells, and after flowing through the fuel cells, unconsumed hydrogen cannot simply be released into the environment. This would be dangerous on the one hand, and too expensive on the other hand. Therefore, the anode exhaust gas is recirculated and admixed to the fresh hydrogen supplied to the fuel cells. However, anode exhaust gas contains not only unconsumed hydrogen, but also water vapor, nitrogen, carbon dioxide and traces of other gaseous impurities, which were partly already present as impurities in the freshly supplied hydrogen, partly generated in the fuel cell reaction, and partly passed from the cathode side through the electrolyte or passed from the cooling water into the anode exhaust gas. If the anode exhaust gas were simply continuously recirculated, these impurities would accumulate more and more, the fuel cell performance would decrease, and eventually the fuel cell reaction would come to a complete standstill. Therefore, water is continuously separated from the anode exhaust gas and, from time to time, part of the anode exhaust gas is not recirculated but flushed out or purged with the aid of fresh hydrogen.

Thus, there is necessary a line or piping system for supplying fresh hydrogen and for treating, recirculating and discharging anode exhaust with sensors for monitoring the gas pressure and/or the gas flow rates, with actuators such as valves or regulators, with safety switches and treatment facilities such as a water separator or trap. The assembly of such a "hydrogen circuit", that is, of all the necessary lines, sensors, actuators and treatment facilities, is time-consuming and cumbersome and demanding in terms of sealing technology, as hydrogen has a high tendency to diffuse.

A combination of all components of a hydrogen circuit in the form of a permanently assembled unit is difficult because fuel cell assemblies are often installed in different orientations relative to the direction of the action of gravity. Accordingly, the ports for supplying and discharging the fuel cell media may be differently oriented relative to the direction of the gravity action, which in turn implies that the components of a hydrogen circuit in the form of a single unit may also have different orientations relative to the direction of the gravity action. Since the fuel cell exhaust gases also contain water in liquid form, which tends to flow in the direction of the gravity action, there is the risk that the flow of the fuel cell media in the lines is hindered by liquid water. When the fuel cell is shut down at ambient temperatures below the freezing point, there is furthermore the risk that freezing water will damage the lines or other components.

Fuel cells are often used in a wide temperature range. Fuel cells in motor vehicles should be able to cope with an operating range between $-40°$ C. and $+85°$ C. At temperatures that possibly may well be far below the freezing point of water, there may not only be problems with product water possibly freezing in the lines. Rather, it is necessary to keep all icing-endangered components, i.e. lines, sensors, actuators (valves, regulators, etc.) free of ice, or to free them of ice very quickly when the fuel cell system starts up. Therefore, it is common practice to equip all icing-endangered components with a device for heating. For this purpose, the icing-endangered components are usually wrapped with heating wires. Also heating cartridges and resistors are used.

In conventional fuel cell systems, lines for supplying and discharging anode operating gas (e.g. hydrogen), cathode operating gas (oxygen or air) and coolant are each individually routed to a fuel cell stack, the hydrogen circuit is assembled from its individual components such as lines, sensors, valves, regulators, water separators, etc., and finally all icing-endangered components are equipped with heating coils or other electric heating devices. These heating devices must be protected against overheating and must be explosion-proof. In particular, when starting up a fuel cell system after a longer standstill, there is the risk that hydrogen has diffused out during the downtime and that an explosive hydrogen/air mixture has formed in the immediate fuel cell environment. If an electric heating device is then turned on in this environment, there may be caused an oxyhydrogen explosion.

When all components and treatment devices required for the supply and discharge of the fuel cell media are each individually connected to a fuel cell assembly, the orientation of the components indeed can be chosen such that problems due to an unfavorable gravity action on the media flowing in the lines are minimized, but this procedure is cumbersome, time-consuming and expensive, in particular also because of the required safety devices. Moreover, the result is often visually unsatisfactory.

BRIEF SUMMARY OF THE INVENTION

It is therefore an object of the present invention to avoid the disadvantages of the prior art and to constructively simplify the supply and discharge of the media necessary for the operation of fuel cells.

In particular, an object of the present invention consists in simplifying the construction of the hydrogen circuit and the sealing thereof.

Moreover, it is an object of the present invention to improve the operability of fuel cell systems at temperatures below the freezing point of water.

An additional object of the present invention is to improve the safety of fuel cell systems when starting up after prolonged downtimes at temperatures below the freezing point of water.

According to a further object of the present invention, the supply and discharge of all media necessary for the operation of fuel cells should be such that a trouble-free supply and discharge is ensured in case of different positions of the fuel cells to be supplied.

The objects are met by the media management plate having the features as indicated in claims 1 and 2, by the fuel cell system having the features as indicated in claim 21, and by the method of operating a fuel cell system having the features as indicated in claim 22. Embodiments of the invention are set forth in the respective dependent claims.

According to the invention, all lines and connections or ports for the supply and discharge of the media necessary for the operation of fuel cells, along with the required sensors, valves and regulators, and in particular also the anode operating medium circuit with all sensors, actuators, and safety devices are combined in a single component, the media management plate.

In one embodiment of the invention, one of the fuel cell media, the coolant, is used to keep lines, sensors, and actuators free of ice. Thus, the functionality of the media management plate is guaranteed also in freezing conditions and in case of cold starts under freezing conditions.

In another embodiment of the invention, the functionality of the media management plate under freezing conditions is improved by an advantageous placement and shaping of the components of the media management plate. In this embodiment, the individual components of the media management plate are designed and arranged such that the supply of the fuel cell media and the discharge of the used media is possible both with horizontally installed fuel cells and with vertically installed fuel cells. Such an arrangement and design also has the advantage that water present in the lines can flow into areas where frozen water is not or only slightly disturbing.

The media management plate is compact and extremely user-friendly due to the small number of components to be handled. Due to the fact that electric heating devices can be dispensed with, it is also safe in terms of application, while it can nevertheless be used under freezing conditions without any problem. Media management plates that allow fuel cell media to be supplied and discharged, both with an orientation perpendicular to the action of gravity and with an orientation parallel to the action of gravity, ensure a high degree of flexibility. Experience shows that particularly advantageous are media management plates in which at least components particularly susceptible to icing can be heated by means of coolant lines for receiving coolant that has been heated externally of the media management plate, and which are in contact with the components susceptible to icing, and which are also flexible with regard to their installation position.

The media management plate according to the invention consists of a plate base body, valves, measuring and regulating and control devices mounted to the plate base body and ports for the supply and discharge of the media to be supplied and discharged and for connection to a fuel cell assembly. The media to be supplied and discharged are anode operating gas, anode exhaust gas, liquid water separated from the anode exhaust gas, cathode operating gas, cathode exhaust gas, fresh coolant, and used coolant. The anode operating gas is typically hydrogen, and the cathode operating gas is typically air. It is understood, however, that the invention is not limited to the use of hydrogen and air, but is basically applicable to all anode operating gases and cathode operating gases. As coolant in the present invention, there is preferably used a glycol/water mixture, for example, in the ratio of glycol:water=1:1, but of course other coolants, for example, pure water or other coolant mixtures may be used as well.

An exemplary media management plate of the present invention comprises a plate base body, such as of metal or plastic. A plate is understood to be a flat geometric body which is bounded by two opposite major surfaces and narrow sides on its outer periphery. The base body may have any shape in plan view, but usually has a shape similar to the fuel cell assembly to which it is to be attached, that is, a rectangular shape.

The major surface of the plate base body intended for attachment to a fuel cell assembly is referred to herein as the first major surface. On the other major surface, the second major surface, there is located a media line or conduit system with lines for supplying the fuel cell media anode operating gas, cathode operating gas and coolant and for discharging the used fuel cell media.

The anode operating gas line for supplying anode operating gas, on the second major surface, has a port for connection to an anode operating gas source. The anode operating gas line extends through the plate base body to the first major surface where there is a port for connection to an anode operating gas inlet of a fuel cell assembly. The anode exhaust gas line, on the first major surface, has a port for connection to an anode exhaust gas outlet of the fuel cell assembly. The anode exhaust gas line extends through the plate base body to the second major surface of the plate base body and to a water separator. There, liquid water entrained in the anode exhaust gas is separated and collected in a water reservoir. From the reservoir, the anode exhaust gas line continues to a port for a recirculation pump, which can be attached to the second major surface or can be provided separately. To close the anode exhaust gas recirculation circuit, a further line is provided on the second major surface, which opens into the anode operating gas line and has a port for connection to the recirculation pump.

As an alternative to the recirculation pump, a jet nozzle (Venturi nozzle) can also be provided. When using a Venturi nozzle, this is located in the anode operating gas line, and the exhaust gas line coming from the water reservoir leads directly into the Venturi nozzle.

Branching from the anode exhaust gas line is an anode exhaust gas bleed or discharge line, through which anode exhaust gas can be periodically purged out of the system. The anode exhaust gas bleed line has a port for connection to an anode exhaust gas disposal device. This can be, for example, a device which utilizes hydrogen thermally, a collecting container, or also a line for release into the environment, if the place of use of the fuel cell system permits release of anode exhaust gas into the environment.

Attached to the second major surface of the plate base body are, furthermore, the valves, measuring devices, regulating and control devices as well as the safety devices required for the supply of anode operating gas and the discharge of anode exhaust gas. The lines have the appropriate connections or ports, valve seats, and locations for mounting sensors, such as pressure sensors and temperature sensors. Such sensors may be provided directly in the lines for anode operating gas or anode exhaust gas or in a separate measuring branch line.

The cathode operating gas line for supplying cathode operating gas has, on the second major surface, a port for connection to a cathode operating gas source. The cathode operating gas source is mostly a fan supplying air to the fuel cell system, but it is just as well possible to make use of a pressurized gas container with an oxygen/nitrogen mixture or any other source of cathode operating gas. The cathode operating gas line passes through the plate base body to the first major surface where there is a port for a cathode operating gas inlet of a fuel cell assembly.

The cathode exhaust gas line, on the first major surface of the plate base body, has a port for connection to a cathode exhaust gas outlet of the fuel cell assembly. This cathode exhaust gas line passes through the plate base body from the first major surface to the second major surface where there is a port for connecting the cathode exhaust gas line to a cathode exhaust gas disposal device. The cathode exhaust gas disposal device is typically a line through which the cathode exhaust gas is released into the environment.

As with the anode operating gas line and the anode exhaust gas line, sensors for measuring pressure and temperature, or the flow velocity, are also required in the cathode operating gas line and the cathode exhaust gas line. Valves or safety devices can also be provided. The lines have appropriate ports or seats for the required sensors, actuators, valves or regulators, which in case of a ready-to-use management plate are located on the second major surface of the plate base body.

On the second major surface of the plate base body, there is also located the water reservoir in which the liquid water is collected, which is separated from the anode exhaust gas by means of a water separator at the entrance of the water reservoir. The water can be drained from the reservoir via a channel. Preferably, the water reservoir is equipped with a level switch which causes a valve in the water channel to open when a predetermined filling level is reached. The level switch, the water drain valve and a port permitting the removal of water from the water channel are also attached on the second major surface of the plate base body.

For supplying and discharging coolant, the media management plate has a coolant line for supplying coolant to the fuel cell assembly, and a used coolant line for discharging coolant from the fuel cell assembly. The coolant line has a port for connection to a coolant source on the second major surface of the plate base body. It extends through the plate base body to the first major surface where there is a port for connection to a coolant inlet of the fuel cell assembly. The used coolant line, on the first major surface, has a port for connection to a used coolant outlet of the fuel cell assembly. The used coolant line leads from the first major surface through the plate base body to the second major surface, where there is located a port for connection to a used coolant disposal device.

The coolant may be circulated, that is, the coolant source may be identical to the coolant disposal device, for example, a collecting container that allows replenishment of the coolant as needed or replacement of the coolant as needed.

The lines for coolant and used coolant preferably have sensors for measuring the temperature and optionally the coolant flow rate. The attachment of these sensors to the plate base body is also implemented on the second major surface thereof.

The lines and the remaining components, such as e.g. the water reservoir and a Venturi nozzle, of the media line system may be arranged completely on the second major surface of the plate base body, or they may be fully or partially integrated into the volume of the plate base body. Of course, part of the components of the media line system may also be integrated in the plate main body, while the other part is located on the second major surface of the plate base body. For example, the "hydrogen circuit", i.e. the anode operating gas line, the anode exhaust gas line, the anode exhaust gas recirculation line leading to a Venturi nozzle, the Venturi nozzle itself, the anode exhaust gas discharge or bleed line and possibly a measuring branch line may be integrated completely into the volume of the plate base body, while the water separator with water reservoir is partially integrated into the plate base body. The cathode operating gas line and the cathode exhaust gas line as well as the coolant line and the used coolant line, depending on the position of the cathode operating gas inlet, the cathode operating gas outlet, the coolant inlet and the used coolant outlet of the fuel cell assembly, may be provided simply in the form of passages through the plate base body, i.e., as through openings from the first major surface to the second major surface. At the inlets and outlets, there can be attached ports or connections in which the required sensors and/or regulators or controllers are integrated.

In case of a partial or complete integration of all lines or of part of the lines of the media line system and other components, such as a Venturi nozzle, in the volume of the plate base body is desired, the plate base body is preferably manufactured by a 3D printing process. The manufacture in a 3D printing process allows a simple and precise formation of all required cavities within the plate base body. Manufacture by casting is possible as well. A particular advantage of integrating as many components of the media line system as possible into the volume of the plate base body is that no seals are required within the plate base body. Thus, there can be no leaks, either, which is very important especially for the very easily diffusing hydrogen. In the case of a media management plate with a maximum degree of integration, only the connecting locations for lines for supplying the fuel cell media and for discharging the used fuel cell media as well as the connecting locations for valves, measuring devices and regulating and control devices are visible on the first and second major surfaces of the plate base body. At these connecting locations, the respectively required connection pieces or the valves, sensors and actuators will be attached.

Alternatively, it is of course also possible to attach the lines of the media line system to the second major surface of the plate base body as separate components and to connect the same to each other. Mixed forms may also be advantageous, that is to say part of the components of the media line system may be integrated into the volume of the base body, while another part of the components is fastened to the second major surface of the plate base body in the form of separate components and connected to the components of the media line system that are integrated into the plate base body.

A preferred embodiment of the media management plate according to the invention is designed such that icing-endangered components can be heated by means of the coolant. As is known, in the fuel cell reaction, water is formed which can condense in the lines. Normally this is not a problem during operation of a fuel cell system, but at a standstill of the fuel cell system at temperatures below the freezing point of water, the entrained product water freezes in the lines and other cavities. This can result in that re-launching of the fuel cell system at a temperature below the freezing point of water is not possible because lines are blocked by ice, valves cannot be moved, or even sensors were destroyed by the pressure of the freezing water. In conventional fuel cell systems, the problem is counteracted by electrical heating of icing-prone or icing-endangered components. In this context, there are created electrical sparks in the immediate vicinity of the fuel cells.

The problems of the prior art are avoided according to the invention in that the coolant line of the media management plate is routed such that a heat transfer from the coolant to icy or potentially icing components of the media management plate is possible. The heat transfer should be as efficient as possible. Therefore, in the media management plate according to the invention, the coolant line is preferably in contact with the icing-endangered components, with the contact surfaces between coolant line and the components to be heated being made as large as possible. Preferred materials for the coolant line and the components to be heated are good thermally conducting materials such as e.g. metals.

Particularly icing-endangered components are in particular the lines of the hydrogen circuit with the required valves, measuring devices, regulating and control devices and the water separator with water reservoir. The cathode exhaust gas line is also highly susceptible to icing. The coolant line preferably extends in thermally conducting contact with these lines and their valves, measuring devices and regulating and control devices. When the lines are on the surface, that is, on the second major surface of the plate base body, heating and heated lines can be provided with a common insulation. When heating and heated lines are formed as cavities in the volume of the plate base body, the corresponding cavities are preferably made with the smallest distance from each other that is possible in terms of manufacturing technology.

It is possible to route the coolant line or have the same extend such that it comes into contact with all components, the heatability of which by means of coolant is desired. It is more advantageous, however, to provide one or more coolant branch lines which branch off from the coolant line and can be opened or closed by means of a valve for the passage of coolant therethrough. During normal fuel cell operation, the valve is closed and the coolant flows into the fuel cell assembly by the shortest route. If there is any suspicion or certainty that there is frozen water in the media line system, the valve leading to the coolant branch lines is opened so that coolant can flow to the icy components and thaw the ice. Thereafter, the valve is closed again, so that the coolant flows into the fuel cell assembly by the shortest route. In this preferred embodiment with coolant branch line(s), the statements made hereinbefore with respect to the coolant line apply, of course, analogously, that is the coolant branch line(s) must be routed or extend such that an efficient heat transfer from the coolant to the icing-endangered components can take place.

The coolant is fed from a coolant reservoir into the coolant line. Preferably, the used coolant is supplied to the same reservoir, i.e. the coolant is circulated. The coolant reservoir is heatable, so that the coolant in the container, which has assumed the ambient temperature after a prolonged downtime of the fuel cell system and thus may have a temperature well below the freezing point of water or may even be frozen, can be heated to a temperature suitable for preheating the media line system, for example to a temperature between 3 and 8° C. The heating of the coolant reservoir can be effected electrically, for example, wherein the coolant reservoir need not be located in the immediate vicinity of the fuel cell.

The media management plate permitting heating of icing-endangered components thus improves the flexibility of fuel cell systems equipped therewith with respect to the operating temperature range, i.e. in terms of ambient temperatures, where reliable and safe operation, and in particular a safe restart after a longer downtime is possible.

Fuel cell assemblies may, in principle, consist of a single fuel cell, but typically consist of a fuel cell stack or multiple fuel cell stacks. The fuel cell assemblies have inlets for anode operating gas, cathode operating gas and coolant through which the respective medium is fed into a distribution or manifold system from where it is distributed to the individual fuel cells. Additionally, the fuel cell assemblies have outlets for anode exhaust gas, cathode exhaust gas, and used coolant, through which these media, coming from corresponding collection devices, are discharged.

A media management plate has corresponding outlets and inlets for anode operating gas and anode exhaust gas, cathode operating gas and cathode exhaust gas, and coolant and used coolant at the appropriate locations such that, by placing the media management plate on the fuel cell assembly and attaching the same to the fuel cell assembly, a gas-tight connection is established between anode operating gas outlet of the media management plate and anode operating gas inlet of the fuel cell assembly, between anode exhaust gas inlet of the media management plate and anode exhaust gas outlet of the fuel cell assembly, between cathode operating gas outlet of the media management plate and cathode operating gas inlet of the fuel cell assembly, between cathode exhaust gas inlet of the media management plate and cathode exhaust gas outlet of the fuel cell assembly, and a fluid-tight connection is established between the coolant outlet of the media management plate and the coolant inlet of the fuel cell assembly, and between the used coolant inlet of the media management plate and the used coolant outlet of the fuel cell assembly. In this manner, the supply of the media required for fuel cell operation as well as the treatment and disposal thereof is ensured by attachment of the media management plate according to the invention to a fuel cell assembly, in one single step.

Of course, the fixation of the media management plate to the fuel cell assembly has the consequence that a change in the position of the fuel cell assembly, for example a rotation, causes a corresponding change in the position of the media management plate. Fuel cell assemblies are not normally operated as isolated unit, but installed in some location, for example in a motor vehicle, in which the orientation of the fuel cell assembly can vary in accordance with the particular spatial situation. Typically, the installation of fuel cell assemblies is such that the stacking direction of the fuel cells is either parallel or perpendicular to the direction of the action of gravity. Accordingly, the major surfaces of the plate main body of the media management plate are then oriented parallel or perpendicular to the direction of the action of gravity. As liquids such as process water tend to flow in the direction of gravity action, care must be taken when arranging the lines for the supply and discharge of the fuel cell media, the sensors and possible water collection containers of the media management plate that liquid water can easily drain. Otherwise, at temperatures below the freezing point of water, water could accumulate, freeze, and cause considerable damage to the media management plate due to expansion during freezing.

When all lines and other components required for supply and discharge of the fuel cell media are attached separately to the fuel cell assembly, it will be no problem to attach them to differently oriented fuel cell assemblies such that an unimpeded drain of liquids is ensured. The situation is different when all of these lines and other components are combined into a single unit and are thus fixed in terms of their position and orientation in invariable manner, as is the case with the media management plate according to the invention. In order to be able to use the media management plate both for fuel cell assemblies installed parallel to the direction of gravity (stacking direction parallel to the direction of gravity) and for fuel cell assemblies installed perpendicular to the direction of gravity, it must be ensured that in neither of the two orientations process water can accumulate at any location, except, of course, the water reservoir in which process water separated from the anode exhaust gas is collected. It must be ensured in this water reservoir that, in both orientations of the media management plate, anode exhaust gas can freely flow in and out, without water from the water reservoir entering the anode exhaust gas lines, and that collected water can be drained from the water reservoir in both orientations of the media management plate.

In the media management plate according to the invention, the problem is solved by a suitable course of the lines of the media line system, by a suitable shape or arrangement of water reservoir and sensor cavities, and by a suitable arrangement of the supply lines and discharge lines into and out of the water reservoir.

For clarification, what is to be understood by "suitable" in the context of the present invention, there are defined ranges by means of which the spatial relationship of the components of the media management plate relative to each other can be defined.

The terms "proximal" and "distal" refer to relative positions in a direction perpendicular to the direction of extension of the plate base body. The proximal region is closer to the first major surface of the plate base body than the distal region, that is, when the media management plate is attached to a fuel cell assembly, "proximal" is closer to the fuel cell assembly than "distal."

The terms "inside" and "outside" or "inner region" and "outer region", on the other hand, denote relative positions in a direction parallel to the extension direction of the plate base body.

The outer region is closer to the edge, i.e. at the outer circumference, of the media management plate than the inner region.

The terms "top" and "bottom" or "upper/uppermost region" and "lower/lowermost region" designate relative positions with respect to the direction of the gravity action. By definition, gravity acts from top to bottom.

It is emphasized that the terms are not to be understood as absolute terms, but rather define positions of the components relative to each other.

A "vertical" media management plate or "vertical" plate base body is oriented parallel to the direction of the gravity action, and a "horizontal" media management plate or "horizontal" plate base body is oriented perpendicularly to the direction of the gravity action.

In a media management plate according to the invention, the water reservoir is located in the outer region of the plate base body and has a shape which has a proximal and a distal region. The distal region of the water reservoir at the same time should be as far outside as possible so that the media management plate can be oriented vertically such that the distal region is at the bottom. In this way, it is ensured that the product water separated from the anode exhaust gas accumulates in the distal region of the water reservoir in case of a horizontal orientation of the media management plate, and accumulates in the lower region of the water reservoir in case of a vertical orientation of the media management plate.

A water separator with an anode exhaust gas inlet and an anode exhaust gas outlet is located in the inner proximal region of the water reservoir, which in case of a vertical orientation of the media management plate is at the same time the uppermost region of the water reservoir. This is the region that is filled last with water as the water level in the reservoir rises. Preferably, the reservoir is also provided with a level switch which is located more in the proximal than in the distal region and more in the inner than in the outer region of the water reservoir, but is arranged more distally and more towards the outside than the anode exhaust gas inlet and the anode exhaust gas outlet. In this way, it is ensured that the water reservoir is never completely filled and that liquid water does not pass from the water reservoir into the anode exhaust gas inlet and the anode exhaust gas outlet both in case of a horizontal and in case of a vertical orientation of the media management plate.

The water outlet of the reservoir is located in the distal outer region of the reservoir, which in case of a vertical orientation of the media management plate is at the same time the lower region of the water reservoir. It is thus ensured that product water separated from the anode exhaust gas can be drained both with a horizontal orientation and a vertical orientation of the media management plate.

For measuring the temperature and the pressure and/or the flow rate of the operating gases and exhaust gases flowing in the media line system, the lines of the media line system are provided with sensors for temperature and pressure or the flow rate of the media flowing in the media line system. These sensors are not accommodated directly in the lines in which the operating gases and exhaust gases flow, but in separate cavities (sensor cavities) which are in fluid communication with these lines. The sensor cavities are offset from the respective line in which the measurement is to take place, in the distal direction, i.e., they are spaced further from the first major surface of the media management plate than the line itself. The offset or staggered arrangement is necessary to provide sufficient space for the sensors, i.e. that they do not come into spatial conflict with the plate base body. Furthermore, when the media management plate is mounted vertically to a fuel cell assembly with the water reservoir being located at the bottom, the sensor cavities must be located above the line with which they are in fluid communication. It is thus ensured that in case of a vertical orientation of the media management plate, water flows from the sensor cavities into the associated lines, and in case of a horizontal orientation of the media management plate, there cannot be accumulated so much water in the sensor cavities that the sensor would be affected. Should the water freeze, the sensor remains fully functional. In case of sensors integrated into ports, there is no necessity of a staggered arrangement. It only has to be ensured that water cannot accumulate on the sensors, neither in case of a horizontal orientation of the media management plate nor in case of a vertical orientation thereof.

BRIEF DESCRIPTION OF THE DRAWINGS

The invention will be described in more detail in the following by way of drawings. It is pointed out that the drawings are not to scale and in each case show only the features essential for understanding the present invention. It is understood that additional features may be present, and that the illustrated features may optionally be present in a different arrangement or in combination with other features. Decisive is the understanding of the skilled person. Like reference numerals designate like or corresponding elements each. In the drawings

DETAILED DESCRIPTION OF THE INVENTION

Figure 1:
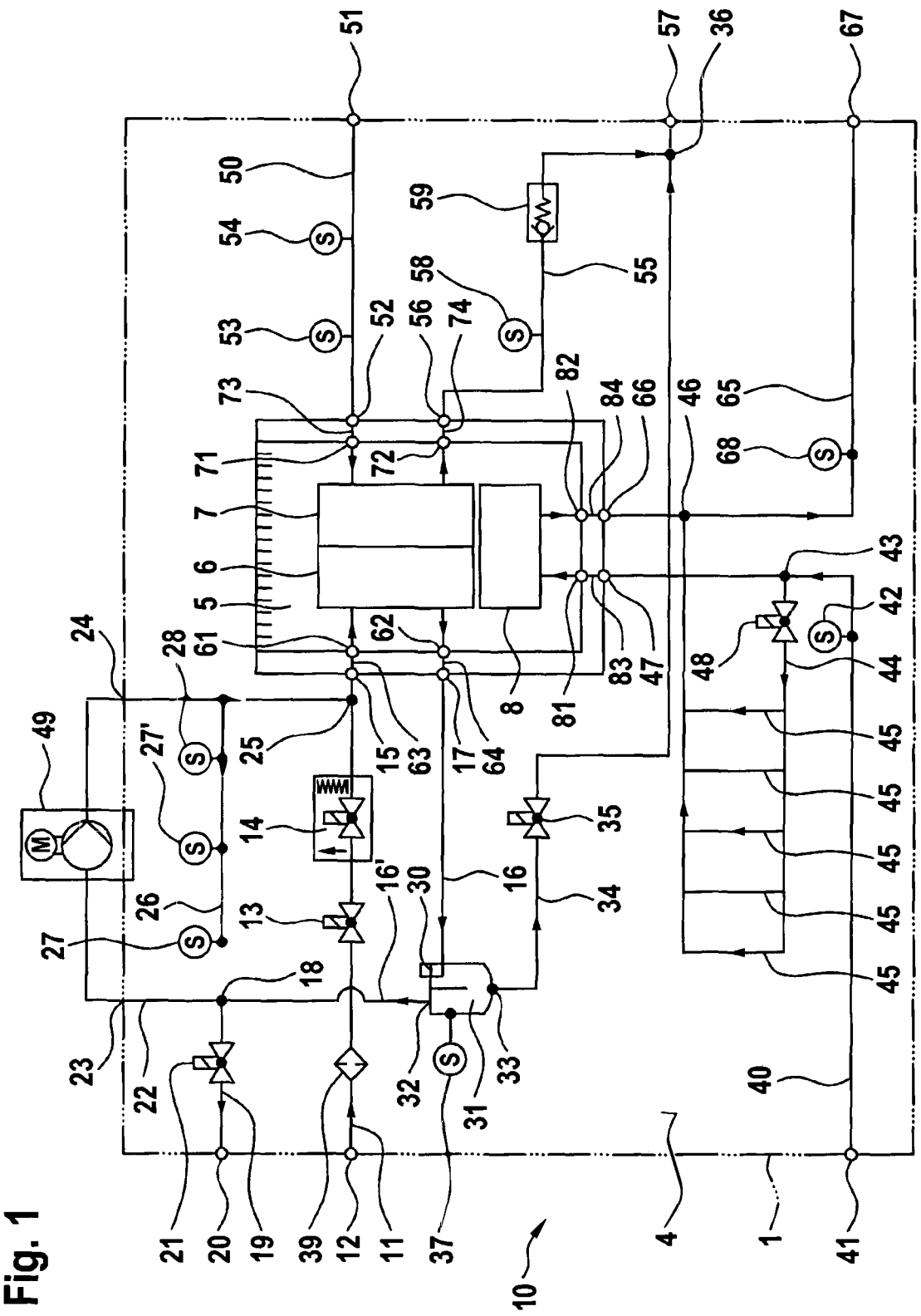
FIGS. 1 and 2 are schematic, highly simplified illustrations of alternative embodiments of fuel cell systems according to the invention.
Figure 2:
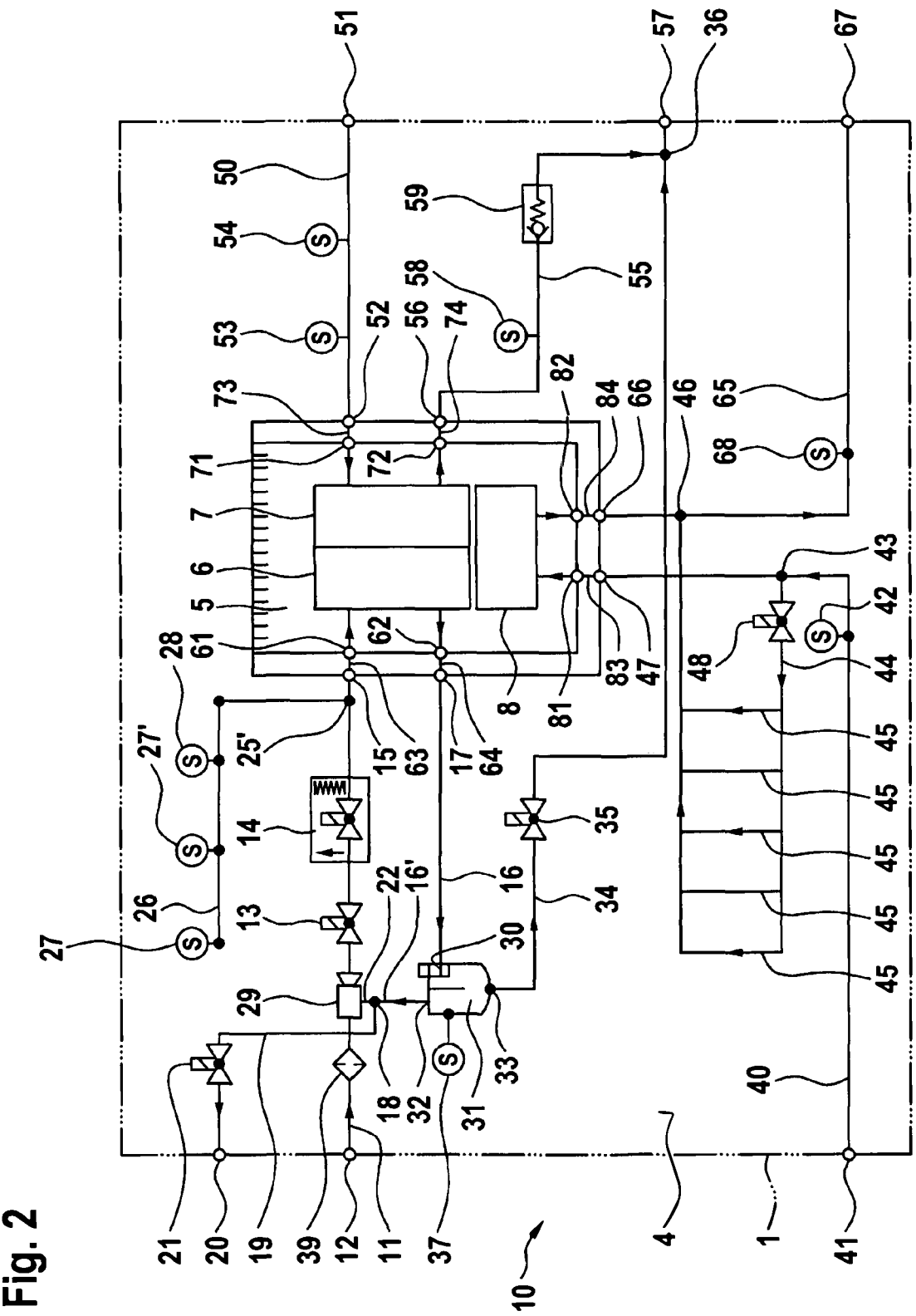

FIGS. 1 and 2 schematically show the structure of fuel cell systems 10 according to the invention. The fuel cell systems 10 each have a fuel cell assembly 5, to which the necessary media for operation are supplied by means of a media management plate 1 according to the invention, while used media are also discharged and optionally treated. The fuel cell system of FIG. 1 and the fuel cell system of FIG. 2 differ merely in that in the embodiment of FIG. 1, a recirculation pump 49 is used for recirculation of the anode exhaust gas, while in the embodiment of FIG. 2, a Venturi nozzle 29 is used for recirculation of the anode exhaust gas.

Firstly, the fuel cell system shown in FIG. 1 will be described. The fuel cell system 10 comprises a conventional fuel cell assembly 5, which is shown schematically in FIG. 1 by a single fuel cell having an anode 6, a cathode 7 and a cooling plate 8. The fuel cell assembly 5 has an anode operating gas inlet 61, an anode exhaust gas outlet 62, a cathode operating gas inlet 71, a cathode exhaust gas outlet 72, a coolant inlet 81, and a used coolant outlet 82.

The media management plate 1 comprises a flat base body, which is typically made of metal or plastic. The base body has a first major surface 3, with which it is attached to the fuel cell assembly, and a second major surface 4 to which the line system for supplying and discharging fresh and used fuel cell media, respectively, and the necessary valves, sensors, actuators and treatment devices are attached. The individual elements will be described in connection with the method of operating the fuel cell system.

In operation of the fuel cell system 10, fresh anode operating gas, e.g. hydrogen, is fed from an anode operating gas source (not shown) through the inlet 12 into the anode operating gas line 11 of the media management plate. In line 11, the anode operating gas flows to an outlet 15 where it exits the media management plate 1. By operating a shut-off valve 13 in the anode operating gas line 11, the supply of fresh anode operating gas is started or terminated as needed. Between the shut-off valve 13 and the outlet 15, there is arranged a pressure reducer 14 which serves to adjust the anode operating gas pressure required for fuel cell operation. In the embodiment illustrated in FIG. 1, the anode operating gas line 11 also contains a particle filter 39 which filters out particles entrained in the anode operating gas. The anode operating gas flowing out of the outlet 15 directly enters the anode operating gas inlet 61 of the fuel cell assembly 5.

Used anode operating gas exits the fuel cell assembly 5 as anode exhaust gas through the anode exhaust gas outlet 62 and enters directly into the anode exhaust gas inlet 17 of the anode exhaust gas line 16 of the media management plate 1. Through the anode exhaust gas line 16, the anode exhaust gas flows to a water separator 30, for example to a swirl separator, in which the entrained product water is separated from the anode exhaust gas. The separated water accumulates in the reservoir 31 while the anode exhaust gas leaves the reservoir 31 through the anode exhaust gas outlet 32 and flows in an anode exhaust gas line 16' and an anode exhaust gas recirculation line 22 to a connection point 23 for a recirculation pump 49. When the recirculation pump 49 is connected, the anode exhaust gas leaves the media management plate 1 at the connection point 23 and reenters the media management plate 1 through the connection point 24 for the recirculation pump. From there, the anode exhaust gas, which still contains unconsumed anode operating gas, flows to a location 25 at which the anode exhaust gas recirculation line 22 opens into the anode operating gas line 11.

From time to time, it is necessary to purge anode exhaust gas from the line system in order to prevent accumulation of undesirable gases such as nitrogen or carbon dioxide in the anode exhaust gas. Purging occurs via the anode exhaust bleed line 19, which branches off at the location 18 from the anode exhaust gas line 16' and leads to an anode exhaust gas outlet 20. An anode exhaust gas purging valve 21 closes the anode exhaust gas bleed line 19 and is regularly opened during fuel cell operation for purging anode exhaust gas.

For monitoring the anode operating gas pressure and the anode exhaust gas pressure, respectively, in the lines for anode operating gas and anode exhaust gas, there are provided pressure sensors, and for ensuring that a predetermined maximum pressure is not exceeded, there are provided excess pressure switches. In the embodiment illustrated, there are provided one pressure sensor 28 as well as two excess pressure switches 27, 27' (redundant for safety reasons) in the measuring branch line 26, which branches off from the anode exhaust gas recirculation line 22. However, such a measurement branch line does not necessarily have to be provided. Rather, the pressure sensor 28 and the excess pressure switches 27, 27' may also be mounted in other locations of the line system for anode operating gas or anode exhaust gas, for example in the anode exhaust gas line 16 or in the anode exhaust gas recirculation line 22. During fuel cell operation, the pressure sensor 28 continuously detects the pressure in the line system. If the pressure detected is below the predetermined target pressure, the valve of the pressure reducer 14 is opened so far that the target pressure is maintained. The excess pressure switches 27, 27' monitor the pressure in the line system and, when a predetermined maximum pressure is exceeded, switch the system to a safe state via a safety circuit, for example by closing the anode operating gas shut-off valve 13.

Cathode operating gas from a cathode operating gas source (not shown) is fed to the cathode operating gas line 50 through the inlet 51. It exits the cathode operating gas line through the outlet 52, from where it is directly fed to the cathode operating gas inlet 71 of the fuel cell assembly 5. In the embodiment illustrated, the cathode operating gas line 50 is equipped with a sensor 53 for measuring the cathode operating gas pressure and with a sensor 54 for measuring the cathode operating gas temperature. As cathode operating gas, there is typically used air, which is supplied from a fan as cathode operating gas source. However, the invention is applicable to any cathode operating gases.

The cathode exhaust gas leaves the fuel cell assembly 5 through the cathode exhaust gas outlet 72, from where it passes directly into the cathode exhaust gas inlet 56 of the cathode exhaust gas line 55. The cathode exhaust gas leaves the media management plate 1 through the cathode exhaust gas outlet 57, wherein in the case of the cathode exhaust gas, unlike the anode exhaust gas, release into the environment is easily possible. In the illustrated embodiment of the media management plate 1, the cathode exhaust gas line 55 is provided with a temperature sensor 58 and a check valve 59. The check valve allows the cathode exhaust gas to escape as long as it exceeds a desired target pressure. When the pressure falls below the target pressure, the check valve 59 closes, so that no penetration of ambient air or other substances into the cathode exhaust gas line 55 is possible.

Coolant is supplied to the fuel cell assembly 5 through the coolant line 40 of the media management plate 1, and discharged again through the used coolant line 65 of the media management plate 1. The coolant line 40 has a coolant inlet 41 through which coolant from a coolant reservoir (not shown) is fed into the coolant line 40. The coolant leaves the coolant line 40 through the coolant outlet 47, from where it is fed directly into the coolant inlet 81 of the fuel cell assembly 5. The heated coolant leaves the fuel cell assembly 5 through the used coolant outlet 82, from where it directly enters the used coolant inlet 66 of the used coolant line 65. The used coolant leaves the line 65 through the used coolant outlet 67, and is preferably directed back into the coolant reservoir from where it can be re-fed to the coolant line 40. Sensors 42, 68 in the coolant line 40 and the used coolant line 65 serve for measuring the temperature of the coolant and the used coolant.

Branching off from the coolant line 40 is a branch line 44 with branching lines 45, which will be described further below.

The water separated from the anode exhaust gas during operation of the fuel cell assembly and collected in the water reservoir 31 may be drained through the water channel 34. The water channel 34 is normally closed by the water drainage valve 35. Valve 35 is opened when a level switch 37 in communication with the water reservoir indicates that the maximum filling level of the reservoir has been reached. In the embodiment illustrated, the water channel 34 opens into the cathode exhaust gas line 55 at location 36, and the drained water exits the media management plate 1 along with the cathode exhaust gas through the cathode exhaust gas outlet 57. After draining a predetermined amount of water, the water drainage valve 35 is closed again.

In the embodiment of the media management plate 1 shown in FIG. 2, the recirculation pump 49 is replaced by a jet nozzle (Venturi nozzle) 29. In the embodiment illustrated, the anode exhaust gas leaves the water reservoir 31 through the anode exhaust gas line 16', which merges into the anode exhaust gas bleed line 19 and the anode exhaust gas recirculation line 22 at the location 18. From the anode exhaust gas recirculation line 22, the anode exhaust gas is sucked into the anode operating gas line 11 through the Venturi nozzle 29. Preferably, the anode exhaust gas recirculation line 22 has a valve arranged therein that closes each time the anode exhaust gas purging valve 21 is opened.

Figure 3A:
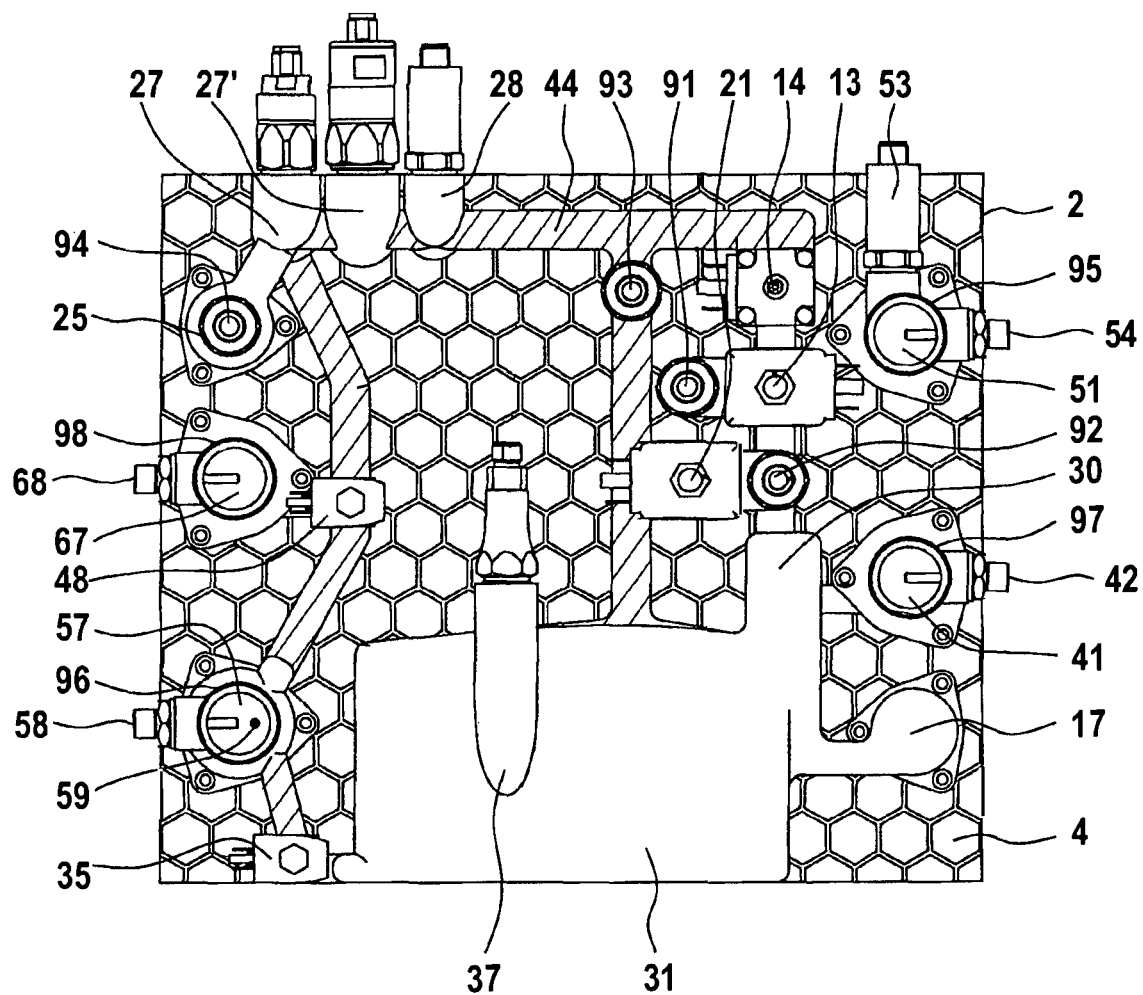
FIGS. 3A, 3B show schematic perspective views of a media management plate according to the invention.
Figure 3B:
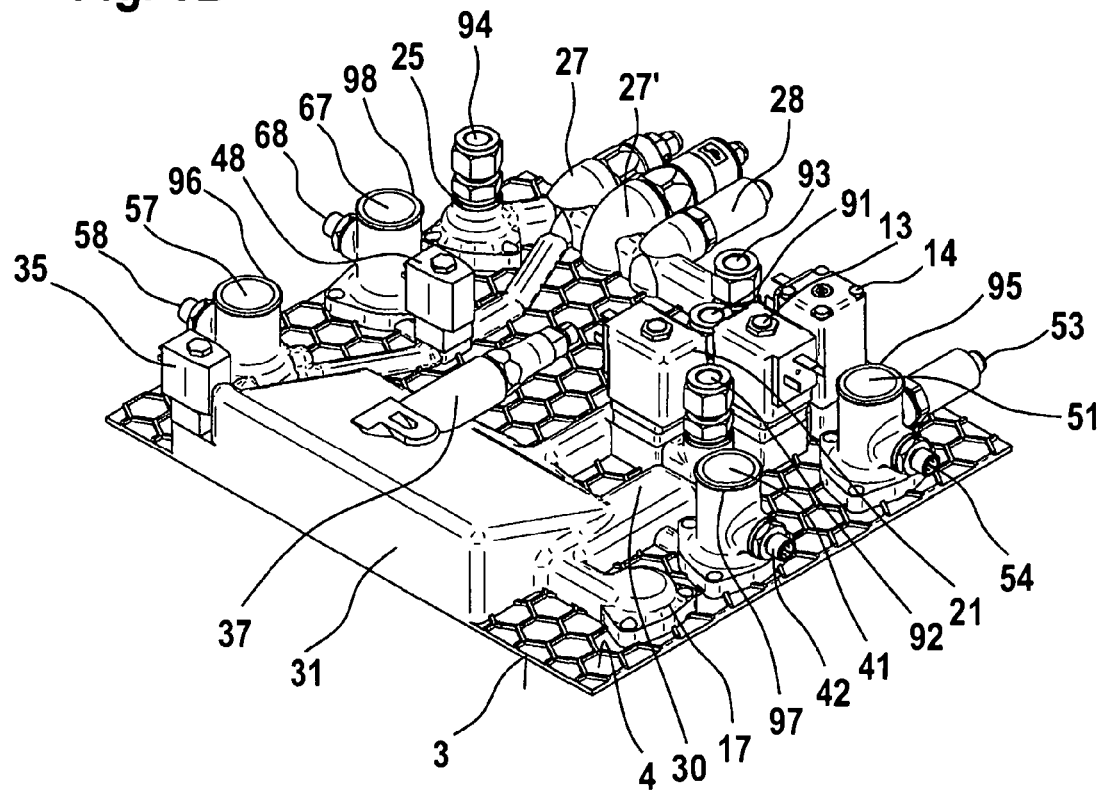
Figure 3C:
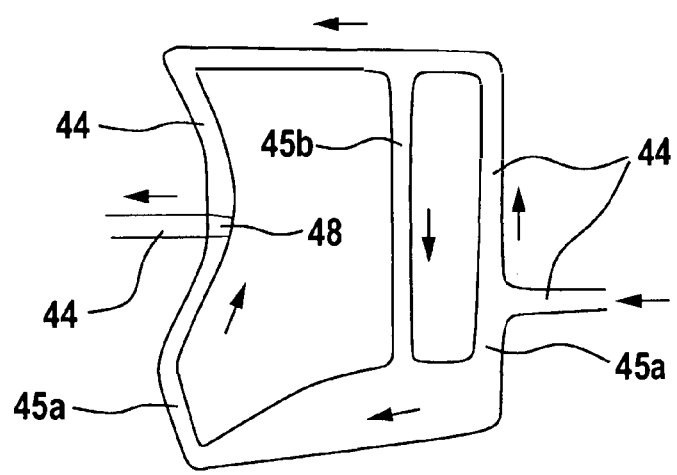
FIG. 3C is a schematic representation of the coolant flow in a coolant branch line of the media management plate of FIGS. 3A and 3B.

In a preferred embodiment of the media management plate according to the invention, the coolant is used to heat icing-endangered components, especially lines and other cavities in which process water can accumulate. For this purpose, the coolant is passed, if necessary, through a coolant branch line 44 which branches off from the coolant line 40 at the location 43 and opens into the used coolant line 65 at the location 46. The coolant branch line 44 may be opened or closed by a valve 48. When the valve 48 is open, coolant flows both through the coolant branch line 44 and directly to the fuel cell assembly 5. In FIGS. 1 and 2, the branch line 44 is shown for reasons of clarity as a line extending separately from the other components of the media management plate 1 and having branching lines 45. In fact, the coolant branch line 44 and, if present, the branching lines 45 extend in thermally conducting contact with the icing-endangered components of the media management plate 1. An exemplary course of the coolant branch line 44 is shown in FIGS. 3A to 3C. FIGS. 3A and 3B show plan views of the second major surface 4 of a plate base body 2, to which the components described in connection with FIGS. 1 and 2 are mounted. The coolant branch line 44 and its branching lines 45a, 45b are shown hatched. Since they are partially covered by the components to be heated, their course is schematically shown once more in FIG. 3C.

In the embodiments of the media management plate 1 shown in FIGS. 3A and 3B, the coolant line 40 (visible are the coolant inlet 41, the connecting piece 97 and the temperature sensor 42), the used coolant line 65 (visible are the used coolant outlet 67, the connecting piece 98 and the temperature sensor 68), the cathode operating gas line 50 (visible are the cathode operating gas inlet 51, the connecting piece 95 and the sensors 53, 54), the cathode exhaust gas line 55 (visible are the cathode exhaust gas outlet 57, the connecting piece 96, the sensor 58 and the check valve 59) are formed as passages through the plate base body 2. The coolant branch line 44 begins at the coolant inlet 41 and runs in contact with the anode exhaust gas outlet 20 (connecting piece 92), the anode operating gas shut-off valve 13, the anode operating gas pressure reducer 14, the pressure sensor 28 and the excess pressure switches 27, 27' (which in the embodiment illustrated are arranged in the anode operating gas line) and eventually leads to the valve 48 and to the coolant outlet 67. The valve 48 in the present embodiment, unlike the embodiments shown in FIGS. 1 and 2, is located at the end of the branch line. A branching line 45a branches off from the branch line 44 immediately after the coolant inlet 41, and below the water reservoir 31 leads to the water drain valve 35, the cathode exhaust gas outlet 57, and finally to the coolant valve 48. Another branching line 45b branches off from the branch line 44 between the pressure reducer 14 and the pressure sensor 28 and leads to the recirculation pump port 23 (visible is the connecting piece 93) and to the anode exhaust gas purging valve 21 to eventually open into the branching line 45a.

The coolant is taken from a coolant reservoir and returned to the coolant reservoir after passing the media management plate. The coolant reservoir preferably can be electrically heated, so that the coolant can be heated to a desired temperature before it is fed into the coolant line 40. Preferably, the coolant is heated prior to startup of the fuel cell system at a temperature below the freezing point of water to a temperature between 3 and 8° C. before it is fed into the coolant line. In this way, the fuel cell system can be "thawed" within a few minutes, i.e. any frozen water in the media line system is liquefied and the system is ready for trouble-free operation. Frozen water in the water reservoir 31 need not be thawed completely when the valve 48 is closed and the coolant is thus passed exclusively to the fuel cell assembly 5.

In FIGS. 3A and 3B, the plate base body 2 of the media management plate 1 is shown as a thin, honeycomb-reinforced plate on the second major surface 4 of which all lines, sensors, valves, as well as the water separator with water reservoir are mounted. However, it is also possible alternatively to integrate all or part of the lines of the media line system and, if desired, the water separator and the water reservoir completely or partially into the volume of the plate base body 2. In this case, the plate base body 2 has a correspondingly greater thickness, depending on whether the lines are to extend completely inside the plate base body or should still be visible on the second major surface 4, or if necessary, the entire water reservoir 31 is to be accommodated completely in the volume of the plate base body. Plate base bodies comprising lines integrated into the volume and possibly other components integrated into the volume, such as a Venturi nozzle integrated into the volume, are preferably manufactured by casting or 3D printing. In particular, 3D printing is preferred because it can easily produce a solid block with cavities of arbitrary shape.

By integrating as many components of the media line system into the volume of the plate base body as possible, the number of screw connections, welds or other connections required is minimized, which considerably mitigates the sealing problem, particularly in the hydrogen circuit. In conjunction with heating by coolant, which can be heated to the desired temperature spatially separated from the media management plate, the safety and usability of fuel cell systems in a wide temperature range, especially at very low temperatures, is significantly improved in comparison with conventional fuel cell systems.

The media management plates according to the invention are each fixed to a fuel cell assembly such that the first major surface of the plate base body faces the fuel cell assembly. The position of the inlets for the fuel cell media and the outlets for the used fuel cell media in a fuel cell assembly each determine the position of the outlets for the corresponding fuel cell media and the inlets for the corresponding used fuel cell media on the first major surface of the media management plate. If a media management plate is fixed to a fuel cell assembly, which is suitable for the arrangement of the inlets and outlets of said assembly, the fluid connections for the exchange of fresh and used fuel cell media between the media management plate and the fuel cell assembly are established simultaneously with the fixation.

Thus, there is exactly one position in which a media management plate can be attached to the particular fuel cell assembly for which it was designed. A change in the position of the fuel cell assembly, for example a rotation, causes a corresponding change in position of the media management plate.

A preferred embodiment of the media management plate according to the invention is designed such that it is functional both in a horizontal lying position (sheet-like extension perpendicular to the direction of the gravity action) and in a vertical standing position (sheet-like extension parallel to the direction of the gravity action). In the vertical "standing" position, the media management plate is laterally attached to a fuel cell assembly, and in the horizontal "lying" position, it is attached to the lower side of a fuel cell assembly. "Above" and "below" refers to the direction of the action of gravity. By definition, gravity acts from top to bottom.

In case of the media management plate that is functional both in the horizontal and in the vertical position, the course of the lines as well as the shape and arrangement of cavities such as sensor cavities are selected such that as little water as possible can accumulate both with a vertical and with a horizontal media management plate. The water reservoir is shaped and arranged such that both in case of vertical and horizontal media management plate, trouble-free inflow and outflow of anode exhaust gas and drainage of the accumulated water is possible. As far as the lines are concerned, this is achieved in a simple way by avoiding line courses with bulges in downward direction. Water reservoirs and sensor cavities will be described in the following.

Figure 4A:
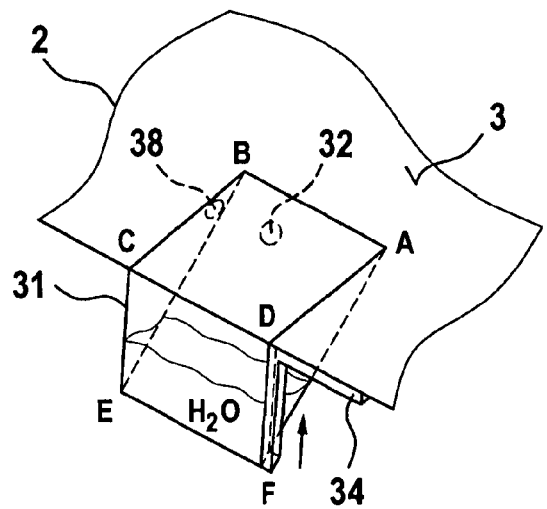
FIGS. 4A to 4C show schematic representations of the water reservoir of a media management plate according to the invention with different orientations of the media management plate.
Figure 4B:
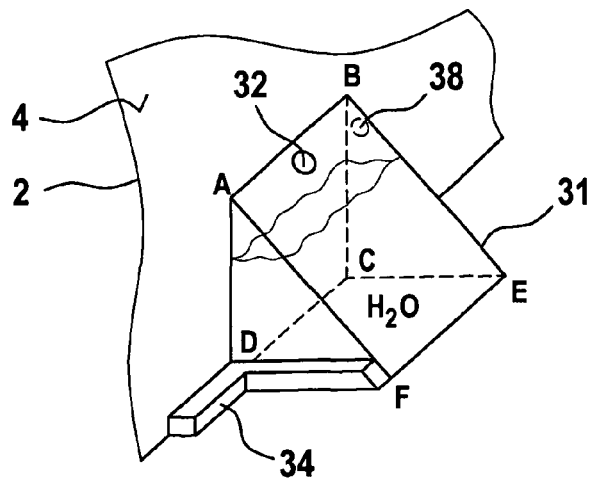
Figure 4C:
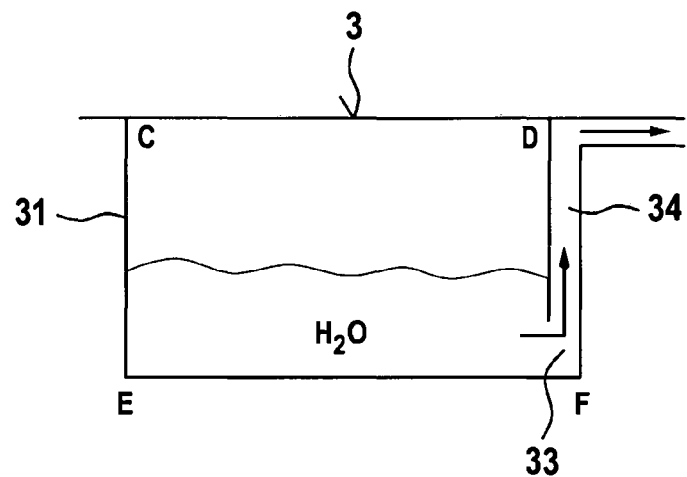

FIGS. 4A and 4B show a water reservoir 31 of a horizontally lying and a vertically standing plate base body 2, respectively. In the embodiment illustrated, the water reservoir 31 has a substantially square base area with corners A, B, C, D, with which it is attached to the second major surface 4 of the plate base body. The water reservoir 31 extends away from the plate base body 2 (distally) to the corners E and F. The anode exhaust gas inlet 38 and the anode exhaust gas outlet 32 are located in a region of the water reservoir 31 which is as close as possible to the plate base body 2 (proximal) and as close as possible to the center of the plate base body 2 (inside). In this way, it is ensured that the anode exhaust gas inlet 38 and the anode exhaust gas outlet 32 are located at the "top" both in the case of a horizontal media management plate and in the case of a vertical media management plate, i.e. at locations which are reached as late as possible in the water reservoir 31 as the water level rises. The water separated from the anode exhaust gas accumulates, following gravity, in the lower region of the water reservoir 31. With the media management plate lying horizontally, the accumulation begins at the edge E/F, and with the media management plate standing vertically, the accumulation begins on the area C-D-F-E. To allow the water reservoir 31 to be easily emptied both with a horizontal and with a vertical media management plate, the water outlet 33 of the water reservoir, through which the accumulated water is discharged into the channel 34, is arranged as close as possible to one of the corners E, F (FIG. 4C). FIG. 4C shows a plan view of the area C-E-F-D of the water reservoir illustrated in FIG. 4A. As shown in FIG. 4C, the discharged water rises in the channel 34 leading to the second major surface 4 of the plate base body 2 in upward direction against the direction of gravity. Responsible for this is the pressure of the anode exhaust gas prevailing in the water reservoir 31.

The reservoir 31 is mounted as close as possible to the outer periphery of the plate base body 2. This ensures that a vertical media management plate can be aligned or rotated such that the reservoir 31 is located at the "bottom". It is understood that the vertical media management plate could theoretically also be rotated such that the reservoir is no longer at the "bottom" but, for example rotated by 180°, is arranged exactly at the "top". However, with a vertical media management plate, the directions "top" and "bottom" are cogently dictated by the location of the ports for feeding fresh fuel cell media to the fuel cell assembly, and for discharging used fuel cell media from the fuel cell assembly. These ports or connections are to be arranged such that, with a vertical media management plate, the reservoir 31 is arranged at a location which guarantees that anode exhaust gas can flow freely in and out and collected water can be drained in unhindered manner.

Preferably, the water reservoir 31 is also equipped with a level switch that opens the water outlet 33 as soon as a predetermined filling level is reached. In order to ensure that the water reservoir can be well filled both with a horizontal and with a vertical media management plate, while nevertheless the anode exhaust gas inlet 38 and the anode exhaust gas outlet 32 are not submerged, this level switch is mounted more in the proximal region than in the distal region, as well as more in the inner region than in the outer region of the water reservoir 31, but more distal and further outside than the anode exhaust gas inlet 38 and the anode exhaust gas outlet 32.

The shape of the water reservoir 31 is basically arbitrary, as long as it is ensured that anode exhaust gas can flow in and out in a unhindered manner and accumulated water can be drained if necessary, both with a horizontal and with a vertical media management plate. Some exemplary shapes are illustrated in FIGS. 5A to 5G. The triangles each indicate possible positions for a level switch.

Figure 5A:
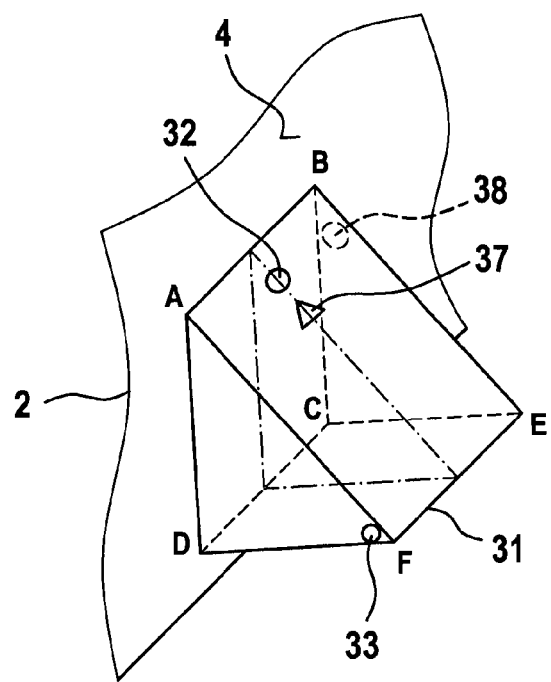
FIGS. 5A to 5G show schematic representations of various forms of a water reservoir.

FIG. 5A shows the reservoir illustrated in FIG. 4. The anode exhaust gas inlet 38 is located in the area BCE, the anode exhaust gas outlet 32 is located in the area ABEF, the level switch 37 is also mounted in the area ABEF, and the water outlet 33 is located in the area ADF.

Figure 5B:
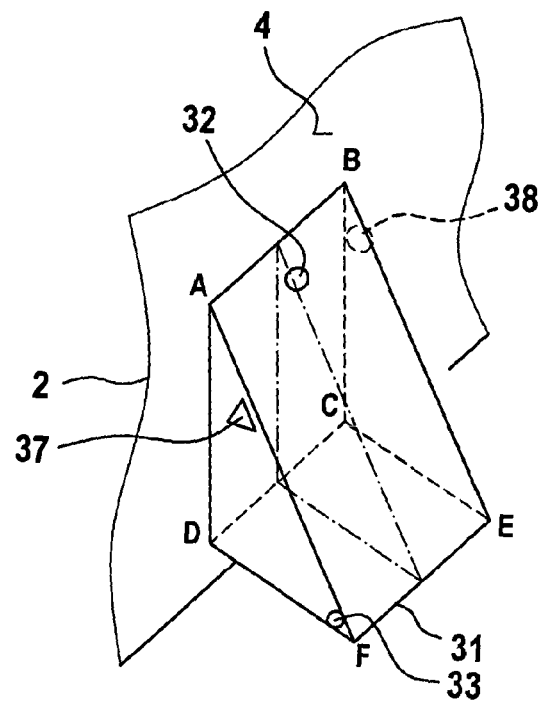
Figure 5C:
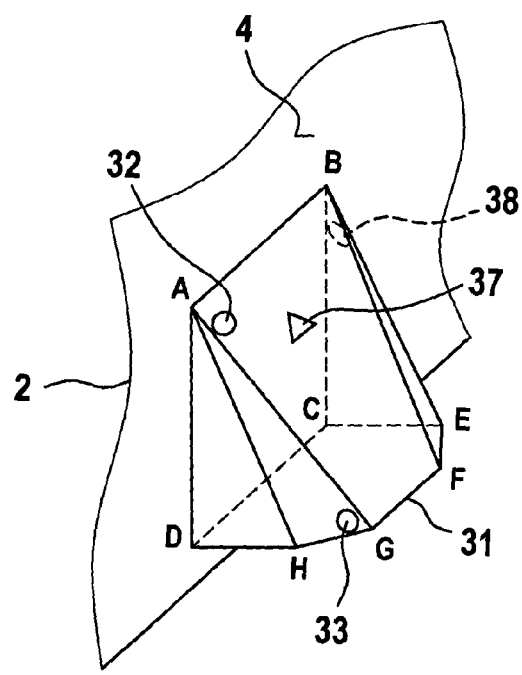
Figure 5D:
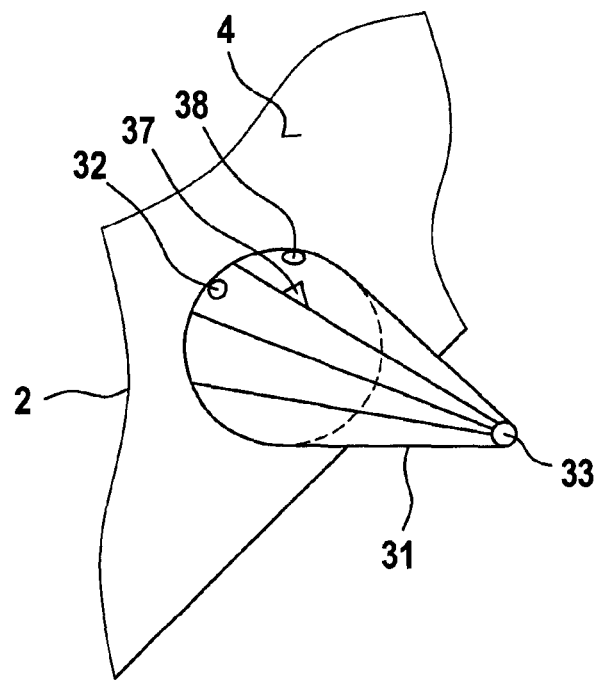
Figure 5E:
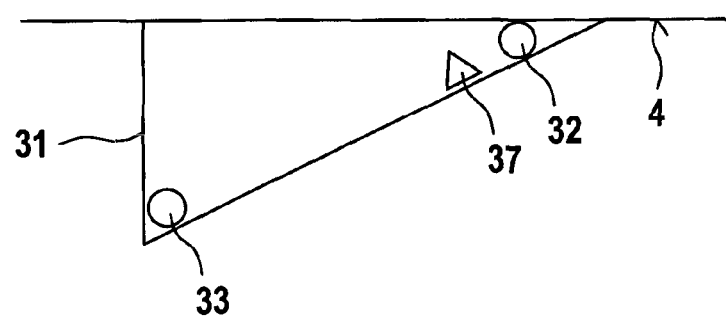

FIG. 5E shows a section through the water reservoir illustrated in FIG. 5A, along the dash-dotted line.

FIG. 5B shows a reservoir similar to FIG. 5A, but with the area CDFE inclined downwardly, as seen in case of a vertical media management plate. The water outlet 33 is located at the lowest point of the reservoir, so that the reservoir can be completely emptied in any orientation.

Figure 5F:
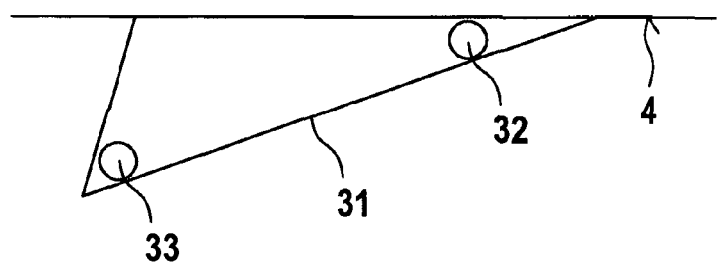

FIG. 5F shows a sectional view through the reservoir of FIG. 5B along the dash-dotted line.

The reservoir 31 illustrated in FIG. 5C is a polyhedron in which the anode exhaust gas inlet 38 is located in the area BEF, the anode exhaust gas outlet 32 and the level switch 37 are located in the area ABFG, and the water outlet 33 is located in the area AGH.

Figure 5G:
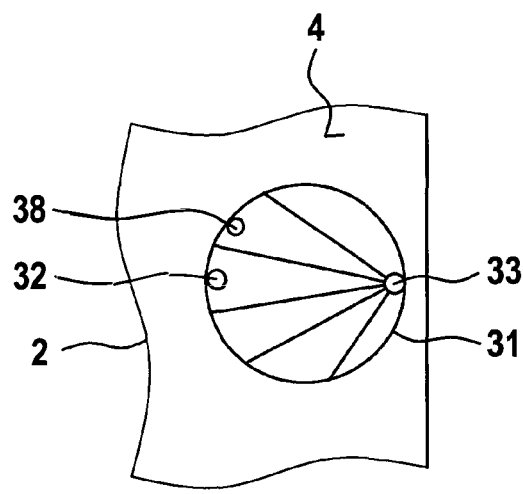

The embodiment of a water reservoir 31 illustrated in FIG. 5D and FIG. 5G has a pointed cone shape. The water outlet 33 is located at the top of the cone, the cone being distorted such that the water outlet is at the deepest point of the reservoir in a vertical standing media management plate.

Figure 6A:
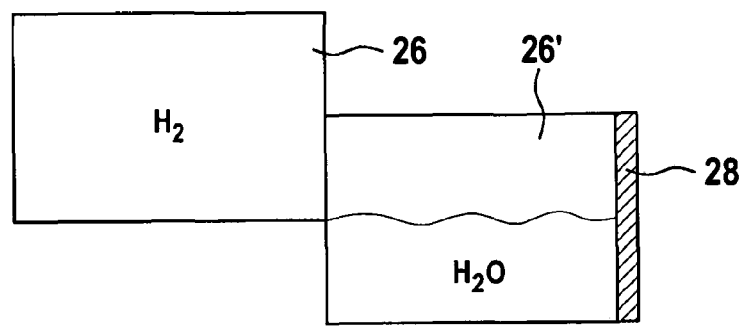
FIGS. 6A to 6D are schematic representations of pressure sensor cavities and their arrangement on a media management plate.
Figure 6B:
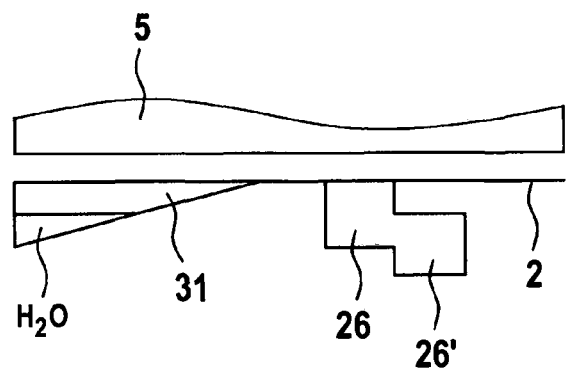
Figure 6C:
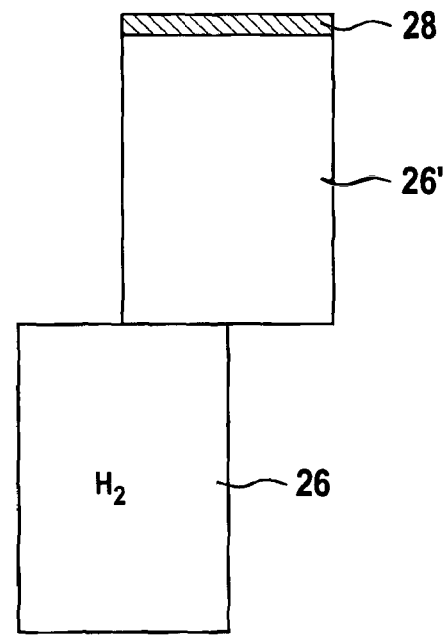
Figure 6D:
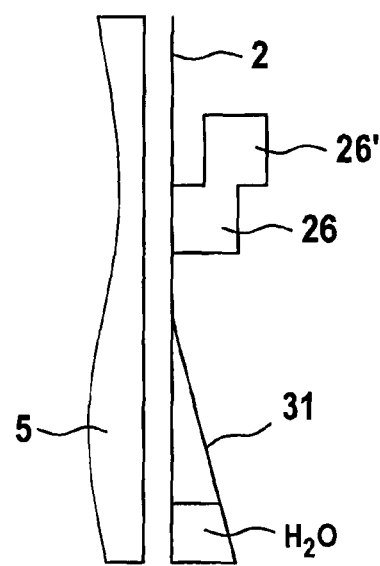

FIGS. 6A to 6D show how cavities for receiving sensors have to be arranged so that larger amounts of water, which freeze at low temperatures and may thus damage the sensor, cannot accumulate therein, neither with a horizontal nor with a vertical orientation of the media management plate. Illustrated by way of example is a pressure measuring cell 28 in a cavity 26' of the measuring branch line 26. FIGS. 6B and 6D illustrate the arrangement of the measuring branch line 26 in a horizontally oriented plate base body 2 (FIG. 6B) and in a vertically oriented plate base body 2 (FIG. 6D). Also shown is the water reservoir 31. The measuring branch line 26 is located above the water reservoir 31 when the base body 2 is vertical. "Above" means that the connection means to the fuel cell assembly 5 demand or at least allow such an orientation.

The cavity 26' for receiving the sensor 28 (sensor cavity 26') is disposed in fluid communication with the line 26, but offset from the line 26, i. e. it is spaced further apart from the first major surface 3 of the media management plate 1 than the line 26. In addition, it is located above the line 26 when the media management plate is arranged vertically. It is thus ensured that, with a vertical media management plate, water from the cavity 26' flows off into the line 26 (FIG. 6C, FIG. 6D), and with a horizontal media management plate, there cannot accumulate so much water in the sensor cavity 26' that freezing water could damage the sensor 28 (FIGS. 6A, 6B).

Such sensor cavities are required in particular in the lines for anode operating gas and anode exhaust gas, respectively. The lines for cathode operating gas and for cathode exhaust gas are preferably designed as passages through the media management plate, so that sensors are usually accommodated in connecting pieces.

Figure 7:
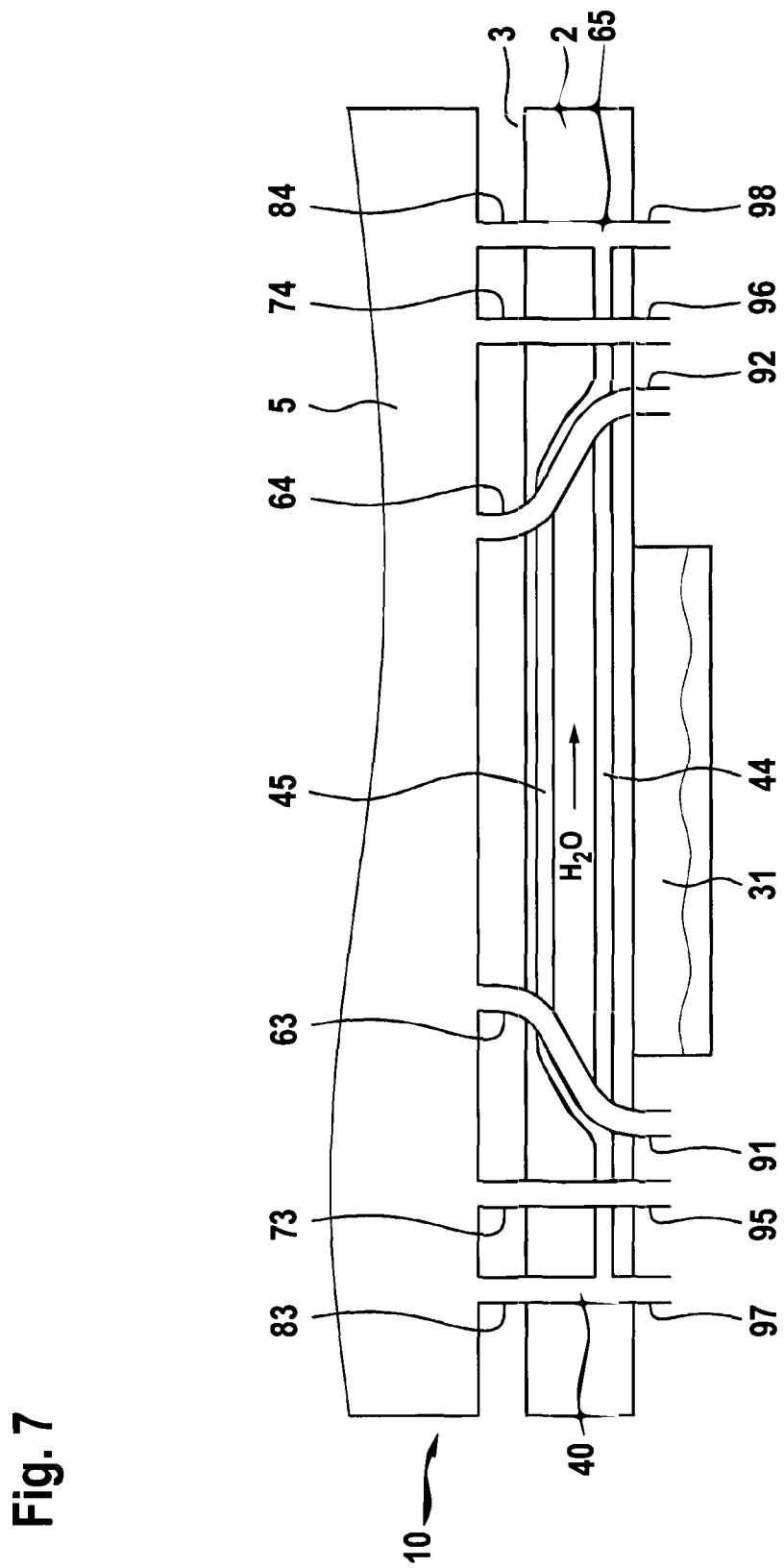
FIG. 7 is a schematic representation of the connection of a media management plate according to the invention with a fuel cell assembly.

FIG. 7 schematically illustrates how a media management plate according to the invention can be connected to a fuel cell assembly so as to form a fuel cell system 10. Port 63 connects the anode operating gas outlet on the first major surface 3 of the plate base body 2 to the anode operating gas inlet of the fuel cell assembly 5. Port 64 connects the anode exhaust gas inlet of the plate base body 2 to the anode exhaust gas outlet of the fuel cell assembly 5. Port 73 connects the cathode operating gas outlet of the plate base body 2 to the cathode operating gas inlet of the fuel cell assembly 5. Port 74 connects the cathode exhaust gas outlet of the fuel cell assembly 5 to the cathode exhaust gas inlet of the plate base body 2. Port 83 connects the coolant outlet of the plate base body 2 to the coolant inlet of the fuel cell assembly 5. Port 84 connects the used coolant outlet of the fuel cell assembly 5 to the used coolant inlet of the plate base body 2.

At the second major surface 4 of the plate base body 2, there are located the port 91 to the anode operating gas inlet 12, the port 92 to the anode exhaust gas outlet 20, the port 95 to the cathode operating gas inlet 51, the port 96 to the cathode exhaust gas outlet 57, the port 97 to the coolant inlet 41 and the port 98 to the used coolant outlet 67.

Coolant lines 44, 45 for heating icing-endangered components are schematically indicated between the coolant line 40 and the used coolant line 65. The embodiment shown in FIG. 7 has no connections for a recirculation pump. Rather, in the illustrated embodiment, a Venturi nozzle is provided for recirculating the anode exhaust gas.

What is claimed is:

1. A media management plate for a fuel cell assembly, comprising:
   a plate base body comprising
      a first major surface that attaches to the fuel cell assembly, and
      a second major surface opposite said first major surface,
   a media line system that supplies fuel cell media with an anode operating gas, a cathode operating gas and a coolant to the fuel cell assembly, and that discharges used fuel cell media from the fuel cell assembly, the media line system comprising
      an anode operating gas line, a cathode operating gas line and a coolant line extending from the second major surface of the plate base body to the first major surface, to supply the anode operating gas, the cathode operating gas and the coolant to the fuel cell assembly, and
      an anode exhaust gas line, a cathode exhaust gas line and a used coolant line extending from the first major surface of the plate base body to the second major surface, to discharge anode exhaust gas, cathode exhaust gas and used coolant from the fuel cell assembly,
   a water separator with a water reservoir to separate liquid water from the anode exhaust gas,
      wherein the water reservoir comprises an inlet opening and an outlet opening for the anode exhaust gas and the liquid water,
   a channel that drains the liquid water from the water reservoir,
   valve seats, measuring devices and regulating and control devices on the second major surface of the plate base body in communication with the media line system or the water reservoir or the channel,
      wherein the anode operating gas line, the anode exhaust gas line, the water reservoir and optionally the channel are in fluid communication with each other, and wherein the coolant line comprises at least one coolant branch line which is at least partially in thermally conducting contact with one or more of the media line system, the channel, the valve seats, the measuring devices and the regulating and control devices, or wherein a shape of the water reservoir and arrangement of the inlet opening and the outlet opening are selected such that the media management plate is oriented both perpendicular to a direction of gravity action and parallel to the direction of gravity action, such that, with gravity acting from top to bottom, the inlet opening and the outlet opening for the anode exhaust gas are located in an uppermost region of the water reservoir and the outlet opening for the liquid water is located in a lowermost region of the water reservoir.

2. The media management plate according to claim 1 wherein the valve seats, the measuring devices and the regulating and control devices are mounted on the second major surface of the plate base body that one or more of measure, regulate and control one or more of an amount, a pressure, a temperature of the fuel cell media flowing in the media line system, and an amount of said liquid water in the water reservoir.

3. The media management plate according to claim 1 further comprising at least one connecting piece at the second major surface of the plate base body that one or more of connects the anode operating gas line to an anode operating gas source, connects the cathode operating gas line to a cathode operating gas source and connects the coolant line to a coolant source.

4. The media management plate according to claim 1, further comprising at least one connecting piece at the first major surface of the plate base body that one or more of connects the anode operating gas line to an anode operating gas inlet of the fuel cell assembly, connects the cathode operating gas line to a cathode operating gas inlet of the fuel cell assembly, and connects the coolant line to a coolant inlet of the fuel cell assembly.

5. The media management plate according to claim 1, further comprising at least one connecting piece at the first major surface of the plate base body that one or more of connects the anode exhaust gas line to an anode exhaust gas outlet of the fuel cell assembly, connects the cathode exhaust gas line to a cathode exhaust gas outlet of the fuel cell assembly, and connects the used coolant line to a used coolant outlet of the fuel cell assembly.

6. The media management plate according to claim 1, further comprising at least one connecting piece at the second major surface of the plate base body that one or more of connects the anode exhaust gas line to an anode exhaust gas disposal device, connects the cathode exhaust gas line to a cathode exhaust gas disposal device, and connects the used coolant line to a used coolant disposal device.

7. The media management plate according to claim 1, wherein the anode exhaust gas line comprises an anode exhaust gas recirculation line opening into the anode operating gas line and connection points to connect to a recirculation pump.

8. The media management plate according to claim 1, further comprising a jet nozzle in the anode operating gas line, with the anode exhaust gas line opening into the jet nozzle.

9. The media management plate according to claim 1, wherein at least the anode operating gas line, the anode exhaust gas line and the water reservoir with the water separator are mounted on the second major surface of the plate base body.

10. The media management plate according to claim 1, wherein one or more of at least one line of the media line system and the water reservoir with the water separator are integrated into a volume of the plate base body.

11. The media management plate according to claim 8, wherein the anode operating gas line, the anode exhaust gas line and the jet nozzle are integrated into a volume of the plate base body.

12. The media management plate according to claim 1, wherein the at least one coolant branch line extends in thermally conducting contact with at least the anode exhaust gas line and the water reservoir with the water separator.

13. The media management plate according to claim 12, wherein the at least one coolant branch line is also in thermally conducting contact with one or more of the valve seats, the measuring devices and the control and regulating devices; and cavities for the measuring devices and the control and regulating devices.

14. The media management plate according to claim 1, wherein the water reservoir comprises a proximal region, a distal region, an inner region and an outer region, wherein the proximal region is closer to the first major surface than the distal region, and the outer region is closer to an edge of the media management plate than the inner region.

15. The media management plate according to claim 14, wherein the water separator along with an anode exhaust gas inlet and an anode exhaust gas outlet are located in the proximal region and the inner region of the water reservoir.

16. The media management plate according to claim 14, wherein the outlet opening is located in the distal region and the outer region of the water reservoir.

17. The media management plate according to claim 14, further comprising a level switch, wherein said level switch is located more in the proximal region than in the distal region, and more in the inner region than in the outer region of the water reservoir, and is located more distal and further outside than an anode exhaust gas inlet and an anode exhaust gas outlet.

18. The media management plate according to claim 14, further comprising at least one cavity configured to receive a sensor, wherein the at least one cavity is in fluid communication with a line of the media line system and is arranged in an offset manner from the line such that the at least one cavity is spaced further from the first major surface of the media management plate than the line and, when the media management plate is arranged parallel to the direction of the gravity action, the at least one cavity is located above the line when the water reservoir is closer to a lower edge of the media management plate than to an upper edge thereof.

19. A fuel cell system comprising:
a fuel cell assembly;
a media management plate, wherein the media management plate comprises
a plate base body comprising
a first major surface that attaches to the fuel cell assembly, and
a second major surface opposite the first major surface,
a media line system that supplies fuel cell media with an anode operating gas, a cathode operating gas and a coolant to the fuel cell assembly, and that discharges used fuel cell media from the fuel cell assembly, the media line system comprising an anode operating gas line, a cathode operating gas line and a coolant line extending from the second major surface of the plate base body to the first major surface, to supply the anode operating gas, the cathode operating gas and the coolant to the fuel cell assembly, and an anode exhaust gas line, a cathode exhaust gas line and a used coolant line extending from the first major surface of the plate base body to the second major surface, to discharge anode exhaust gas, cathode exhaust gas and used coolant from the fuel cell assembly, a water separator with a water reservoir to separate liquid water from the anode exhaust gas, wherein the water reservoir comprises an inlet opening and an outlet opening for the anode exhaust gas and the liquid water, a channel that drains the liquid water from the water reservoir, valve seats, measuring devices and regulating and control devices on the second major surface of the plate base body in communication with the media line system or the water reservoir or the channel, wherein the anode operating gas line, the anode exhaust gas line, the water reservoir and optionally the channel are in fluid communication with each other, and wherein the coolant line comprises at least one coolant branch line which is at least partially in thermally conducting contact with on or more of the media line system, the channel, the valve seats, the measuring devices and the regulating and control devices, or wherein a shape of the water reservoir and arrangement of the inlet opening and the outlet opening are selected such that the media management plate is oriented both perpendicular to a direction of gravity action and parallel to the direction of gravity action, such that, with gravity acting from top to bottom, the inlet opening and the outlet opening for the anode exhaust gas are located in an uppermost region of the water reservoir and the outlet opening for the liquid water is located in a lowermost region of the water reservoir;

wherein the fuel cell assembly and the media management plate are attached to each other;

first connections between the media management plate and the fuel cell assembly that introduce fresh anode operating gas, fresh cathode operating gas and fresh coolant into the fuel cell assembly; and, second connections between the media management plate and the fuel cell assembly that discharge said anode exhaust gas, said cathode exhaust gas and said used coolant from the fuel cell assembly.

20. A method of operating a fuel cell system comprising:
providing a fuel cell assembly;
providing a media management plate,
wherein the media management plate comprises
a plate base body comprising
a first major surface that attaches to the fuel cell assembly, and
a second major surface opposite said first major surface,
a media line system that supplies fuel cell media with an anode operating gas, a cathode operating gas and a coolant to the fuel cell assembly, and that discharges used fuel cell media from the fuel cell assembly, the media line system comprising an anode operating gas line, a cathode operating gas line and a coolant line extending from the second major surface of the plate base body to the first major surface, to supply the anode operating gas, the cathode operating gas and the coolant to the fuel cell assembly, and an anode exhaust gas line, a cathode exhaust gas line and a used coolant line extending from the first major surface of the plate base body to the second major surface, to discharge anode exhaust gas, cathode exhaust gas and used coolant from the fuel cell assembly, a water separator with a water reservoir to separate liquid water from the anode exhaust gas, wherein the water reservoir comprises an inlet opening and an outlet opening for the anode exhaust gas and the liquid water, a channel that drains the liquid water from the water reservoir, valve seats, measuring devices and regulating and control devices on the second major surface of the plate base body in communication with the media line system or the water reservoir or the channel, wherein the anode operating gas line, the anode exhaust gas line, the water reservoir and optionally the channel are in fluid communication with each other, and wherein the coolant line comprises at least one coolant branch line which is at least partially in thermally conducting contact with on or more of the media line system, the channel, the valve seats, the measuring devices and the regulating and control devices, or wherein a shape of the water reservoir and arrangement of the inlet opening and the outlet opening are selected such that the media management plate is oriented both perpendicular to a direction of gravity action and parallel to the direction of the gravity action, such that, with gravity acting from top to bottom, the inlet opening and the outlet opening for the anode exhaust gas are located in an uppermost region of the water reservoir and the outlet opening for the liquid water is located in a lowermost region of the water reservoir;

wherein the fuel cell assembly and the media management plate are attached to each other; introducing said anode operating gas into the fuel cell assembly through the anode operating gas line of the media management plate;

discharging said anode exhaust gas from the fuel cell assembly through the anode exhaust gas line of the media management plate;

recirculating the anode exhaust gas through an anode exhaust gas recirculation line into the anode operating gas line of the media management plate;

introducing said cathode operating gas through the cathode operating gas line into the fuel cell assembly;

discharging said cathode exhaust gas from the fuel cell assembly through the cathode exhaust gas line of the media management plate;

introducing the coolant into the fuel cell assembly through the coolant line of the media management plate;

discharging said used coolant from the fuel cell assembly through the used coolant line of the media management plate;

separating said liquid water from the anode exhaust gas via the water separator with said water reservoir in the anode exhaust gas line of the media management plate;

one or more of measuring, regulating and controlling one or more of a temperature, amount, pressure of the anode operating gas, the cathode operating gas and the anode exhaust gas and the cathode exhaust gas flowing in the media management plate and the amount of said liquid water in the water reservoir via the measuring devices and the regulating and control devices incorporated in the media management plate;

periodically discharging one or more of the anode exhaust gas and the liquid water in the water reservoir of the media management plate; and, heating at least the anode exhaust gas line and the water separator with the water reservoir via the coolant in the at least one coolant branch line which extends in thermally conducting contact with the anode exhaust gas line and the water separator with the water reservoir.

21. The method according to claim 20, wherein prior to startup of the fuel cell system, the coolant is heated to a temperature between 3° C. and 8° C. before being fed into the coolant line of the media management plate.

\* \* \* \* \*